US011029869B1

(12) United States Patent
Patlasov et al.

(10) Patent No.: US 11,029,869 B1
(45) Date of Patent: Jun. 8, 2021

(54) SYSTEM AND METHOD FOR MULTIQUEUED ACCESS TO CLOUD STORAGE

(71) Applicant: Virtuozzo International GmbH, Schaffhausen (CH)

(72) Inventors: Maxim Patlasov, Seattle, WA (US); Alexey Kuznetzov, Moscow (RU); Pavel Emelyanov, Moscow (RU); Alexey Kobets, Seattle, WA (US)

(73) Assignee: Virtuozzo International GmbH, Schaffhausen (CH)

( * ) Notice: Subject to any disclaimer, the term of this patent is extended or adjusted under 35 U.S.C. 154(b) by 101 days.

(21) Appl. No.: 16/235,579

(22) Filed: Dec. 28, 2018

Related U.S. Application Data

(60) Provisional application No. 62/626,196, filed on Feb. 5, 2018.

(51) Int. Cl.
  *G06F 9/455* (2018.01)
  *G06F 3/06* (2006.01)
  *G06F 9/46* (2006.01)
  *G06F 9/50* (2006.01)

(52) U.S. Cl.
  CPC ............ *G06F 3/064* (2013.01); *G06F 3/0611* (2013.01); *G06F 3/0617* (2013.01); *G06F 3/0635* (2013.01); *G06F 3/0646* (2013.01); *G06F 3/0667* (2013.01); *G06F 3/0689* (2013.01); *G06F 9/45558* (2013.01); *G06F 9/463* (2013.01); *G06F 9/5077* (2013.01); *G06F 2009/45575* (2013.01); *G06F 2009/45591* (2013.01)

(58) Field of Classification Search
  None
  See application file for complete search history.

(56) References Cited

U.S. PATENT DOCUMENTS

| | | | | |
|---|---|---|---|---|
| 7,340,640 B1 * | 3/2008 | Karr | ............... | G06F 3/0613 |
| | | | | 711/209 |
| 7,822,921 B2 * | 10/2010 | Taylor | ............... | G06F 3/0611 |
| | | | | 711/114 |
| 9,069,806 B2 * | 6/2015 | Kadatch | ............... | G06F 9/5072 |

(Continued)

OTHER PUBLICATIONS

Gao et al. "Building a Distributed Block Storage System for Cloud Infrastructure," 2010 IEEE, pp. 312-318.*

(Continued)

*Primary Examiner* — Van H Nguyen
(74) *Attorney, Agent, or Firm* — Arent Fox LLP; Michael Fainberg

(57) ABSTRACT

Systems and methods are disclosed herein for multithreaded access to cloud storage. An exemplary method comprises creating a plurality of mount points by mounting, by a hardware processor, a plurality of file systems on a computer system, creating an image file on each of the plurality of mount points, instantiating, for each of the plurality of mount points, a block device on the image file, creating a union virtual block device that creates one or more stripes from each block device, delegating a request for accessing the union virtual block device, received from a client, to one or more block devices and merging a result of the request from each of the one or more block devices and providing the result to the client.

17 Claims, 5 Drawing Sheets

(56) References Cited

U.S. PATENT DOCUMENTS

| | | | |
|---|---|---|---|
| 9,286,310 B1* | 3/2016 | Emelyanov | G06F 16/172 |
| 9,348,819 B1* | 5/2016 | Emelyanov | G06F 16/2308 |
| 9,720,952 B2* | 8/2017 | Kadatch | G06F 9/5072 |
| 9,817,840 B1* | 11/2017 | Emelyanov | G06F 16/172 |
| 10,037,334 B1* | 7/2018 | Lunev | G06F 3/0683 |
| 2012/0011176 A1* | 1/2012 | Aizman | G06F 16/183 |
| | | | 707/822 |

OTHER PUBLICATIONS

Gao et al. "Supporting Cloud Computing with the Virtual Block Store System," 2009 IEEE, pp. 208-215.*

Lei et al. "A Novel Approach to Providing Elaborate Virtual Block Storage Services in Cloud Computing," 2012 IEEE, pp. 612-615.*

* cited by examiner

Conventional Techniques

SYSTEM AND METHOD FOR MULTIQUEUED ACCESS TO CLOUD STORAGE

CROSS-REFERENCE TO RELATED APPLICATIONS

This application claims priority to U.S. Provisional Patent Application No. 62/626,196 filed on Feb. 5, 2018, the contents of which are incorporated by reference herein in their entirety.

FIELD OF TECHNOLOGY

The present disclosure relates generally to the field of accessing cloud services, and more specifically, to systems and methods for multiqueued access to cloud storage.

BACKGROUND

Currently, cloud storage usage is widely spread and is continually being deployed for more varied purposes. Client side software that is responsible for interaction between the client and the cloud services can be implemented in various ways. In some cases, the client side software (e.g., components thereof) is single-threaded and re-implementing the architecture of the software as multithreaded is exceedingly complex to be practical.

For example, a single-queued implementation of file system (that can be for example a user space file system (FUSE)) may be used in some cases. However, many single-queued file systems (e.g., single-threaded file systems) are far too complicated to practically parallelize using multi-threaded concepts. FUSE-based implementations of file systems act as a client side component. Users (e.g., users of a computer system, an application, a virtual machine, a container, or the like) that interact with the file system may attempt to access the files on the file system. All requests to the client-side component of the file system are handled by a single process that transforms the received requests to requests that correspond to the cloud storage service. The single process also receives responses from cloud storage and delivers a response to the user. Consequently, when the user opens files on this file system, the user sees the content provided by cloud storage. The process transmitting requests to the cloud storage can only be executed on a single CPU core at a time because it is single-threaded.

Single-threaded implementations may consume resources of only one CPU core leaving all other cores idle. This greatly limits the number of file system requests per second the system can process, having a dramatically negative influence on the client side component's performance when the system is under load.

In some other cases, the client component may have only one queue of requests, which results in poor scalability.

Therefore, means for improving performance and scalability of client components that access cloud storage are needed.

SUMMARY

The present disclosure provides an effective solution for the foregoing problems of conventional techniques associated with accessing cloud storage. Disclosed are example systems, methods and computer program products for multiqueued access to cloud storage.

In an exemplary aspect, a disclosed method comprises creating a plurality of mount points by mounting, by a hardware processor, a plurality of file systems on a computer system, creating an image file on each of the plurality of mount points, instantiating, for each of the plurality of mount points, a block device on the image file, creating a union virtual block device that creates one or more stripes from each block device, delegating a request for accessing the union virtual block device, received from a client, to one or more block devices and merging a result of the request from each of the one or more block devices and providing the result to the client.

In another aspect, the method further comprises splitting the request, when the request is larger than a predetermined threshold, into multiple requests and delegating the multiple requests to a plurality of block devices.

In another aspect, the client is a file system of a virtual execution environment, and the virtual execution environment is a container or a virtual machine.

In another aspect, the client is a virtual machine, and a virtual machine disk image for the virtual machine is stored on the cloud storage.

In another aspect, the plurality of file systems are user space file systems.

In another aspect, each user space file system is a cloud file system.

In another aspect, the image file is in one of a raw format, or an expanding format, wherein the expanding format is qcow2.

In another aspect, the union virtual block device is one of a raid-stripe, or raid-N.

In another aspect, the computer system is one or more of a chunk server or a metadata server.

According to another exemplary aspect, a system is provided comprising a hardware processor configured to perform any of the methods disclosed herein.

According to another exemplary aspect, a computer-readable medium is provided comprising instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
FIG. 1 is a block diagram illustrating conventional single-queued access to cloud storage.
Figure 1:
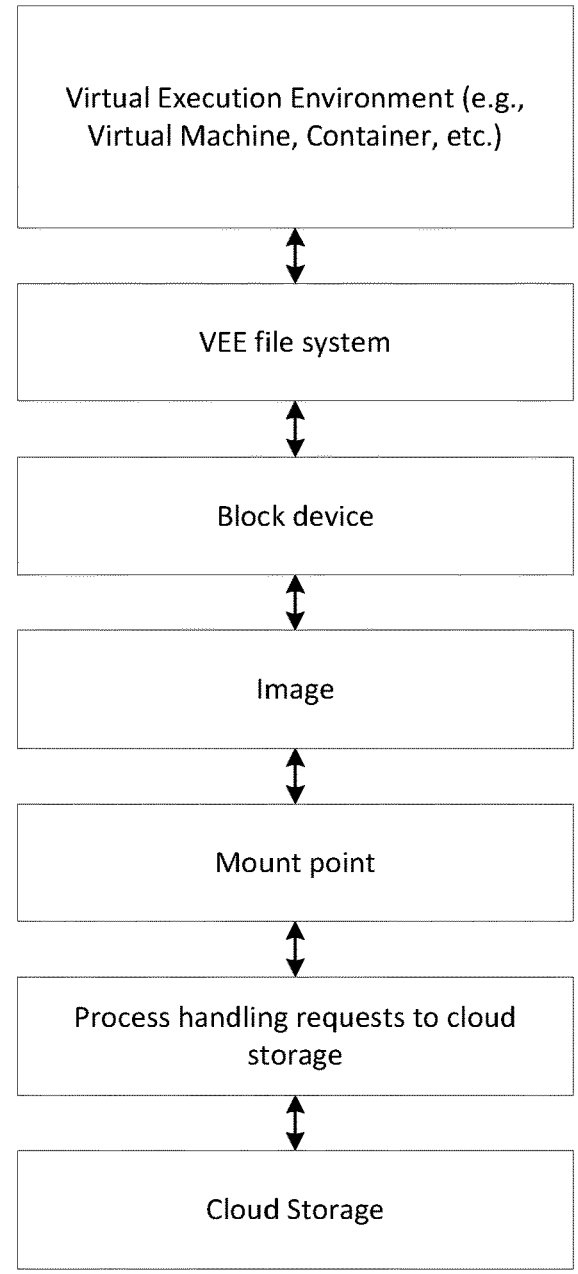

Exemplary aspects are described herein in the context of a system, method, and computer program product for multithreaded access of cloud storage. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A Virtual Execution Environment (VEE) is a type of environment that supports program code execution, where at least a part of the real hardware or software utilized for running program code are presented as their virtual analogs. From the point of view or the user, that the code in VEE runs as if it were running on the real computing system. Examples of VEEs can be any kind of virtual machines (VMs, including lite VMs), containers (including OS containers, stateless containers, or execution containers), and the like.

A Virtual Machine (VM) is a type of an isolated VEE running on the same physical machine simultaneously, wherein hardware resources are virtualized. Each Virtual Machine instance executes its own OS kernel. Support of Virtual Machines is implemented using a Virtual Machine Monitor and/or a Hypervisor.

A container (CT) is one type of a Virtual Execution Environment running on the same hardware system, where containers share operating system (OS) kernel and at least some of the system resources, and where isolation of containers is implemented on the namespace level. In some aspects, a container is defined as an isolated namespace. In some aspects, multiple sets of application services are organized on a single hardware system by placing them into isolated containers.

According to one aspect of the disclosure, an application refers to a set of instructions written in an interpreted language and an interpreter which executes it. In another aspect, (e.g., in the case of a compiled language) an application refers to a precompiled binary created from a set of instructions.

According to one aspect, several instances of client components are working independently, in parallel. In this aspect, large user requests, e.g., those requests that include accessing multiple files, may be split into several smaller requests added to a queue of one or more instances of the client component (in some cases, performed on different CPUs). Responses for these smaller requests will be joined into a single response to the user. In some aspects, these one or more instances are one or more threads of the client component.

For example, if the user asks to read 256 Kb from, for example, a block or a file on the cloud storage, such a fragment can be divided into multiple parts. In one aspect, the request may be divided into four parts, each for 64 Kb of the block or file. Each part will be retrieved from storage by one of four independent instances of client side component that will execute corresponding requests to the cloud storage. Accordingly, the data is retrieved four times faster than a single process client side component. Once all four instances of the client side component receive a response from the cloud storage, the responses are merged into one fragment that is returned as a response to user. Though the example given in this aspect describes dividing the initial request into four parts executing on four instances of the client side component, the present disclosure does not limit the division of the initial request, nor does the present disclosure limit number of instances of the client side component. Additionally, the fragment may be divided into more, less or the same number of parts as the number of instances of client side components, based on how the system is configured.

In one exemplary aspect, the file system acts as a client side software component for accessing cloud storage. In one exemplary aspect, N separate file systems are mounted by an Operating System. The OS mounts each file system by mounting a corresponding block device image file. In one aspect, the block device is a loopback block device, such as a "ploop" device. According to exemplary aspects, a ploop device has loop device driver that provides a way to represent a set of stacked images as a block device. After mounting the N block device image files, N ploop blockdevices are available for use. Subsequently, a virtual device is created that creates one stripe from several fragments provided by ploops. According to one aspect the "dm-raid0" striping virtual device is started on top of the N ploop devices. This final virtual device (e.g., dm-raid0) is the device that the user has access to. In this aspect, a container (or virtual machine, or any virtual execution environment) is started on the virtual device. In some aspects, a container file system will lay on the virtual device. In some aspects, the user can be a virtual machine that is using the system and accesses a virtual machine disk image for the virtual machine stored on the cloud storage. Accordingly, incoming requests initiated by end-user are automatically distributed over all N file systems by the virtual device (e.g., dm-raid0). The virtual device functions equivalent to as if a stripe was built of several hard disk devices (HDDs). It is noted that, in some aspects, data striping is the technique of segmenting logically sequential data, so that consecutive segments are stored on different underlying devices.

Figure 2:
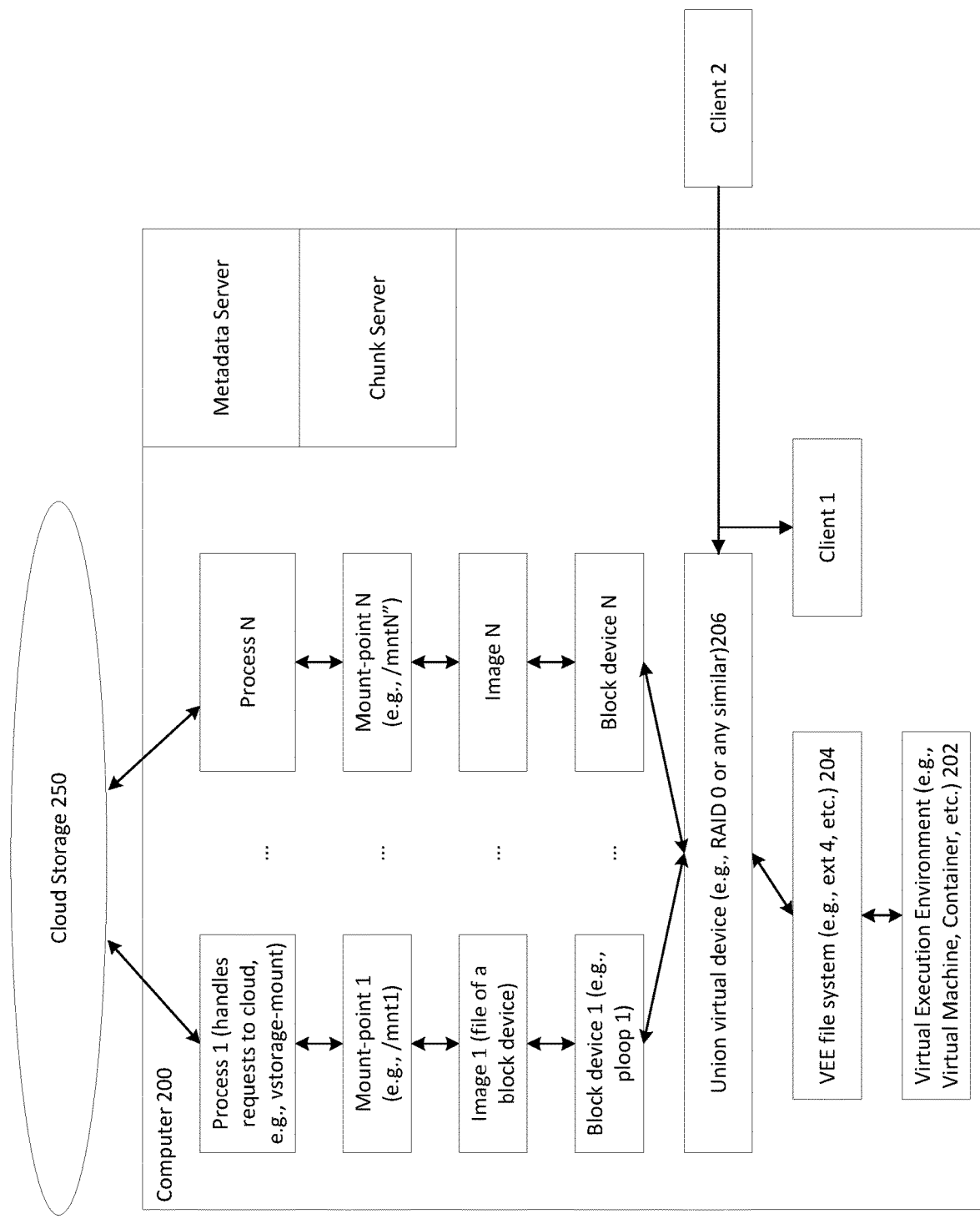
FIG. 2 is a block diagram for a system of multiqueued access to cloud storage, in accordance with exemplary aspects of the present disclosure.

Another exemplary aspect is illustrated in FIG. 2. According to exemplary aspects, a computer 200 can connect to a cloud storage service 250 (also referred to as cloud storage 250). The computer 200 is considered a client of this cloud storage 250. This computer may optionally, in some aspects, contain some data from the storage and serve not only as a client but also as a chunk server or metadata server of the storage. If the computer also serve as a chunk server or a metadata server, then it means that chunk services (CS) or metadata services (MDS) are running on it. The MDS handles/maintains and updates storage metadata, e.g., which and where data chunks are stored, which clients can access the data chunks (on read/write), etc. The CS service is responsible for storing data chunks and providing data to clients. CS may also be responsible for data replication (also called for data redundancy).

The computer 200 may have software installed there on that allows the computer to act as a client of the cloud storage service 250. The software allows the mounting of content of the cloud storage 250 to a directory (hereinafter "mount point"), e.g., "/mnt1". According to one aspect, the cloud storage 250 is a "pstorage" cluster. In one aspect, mounting the content comprises starting a process that handles requests to the file system and send requests to the cloud storage 250. In some aspects, the process is "vstorage-mount". Before mounting the directory (e.g. "/mnt1") was empty and after mounting the request handling process handles read/write requests to the cloud storage. After mounting, the process (e.g., "vstorage-mount") handles interaction with the cloud storage 250. In other words, in this aspect the request handling process providesthe computer 200 access to the data in the cloud storage 250. According to exemplary aspects, the data from the cloud storage 250 is not copied to the mount point (/mnt1), so this directory does not necessarily contain data from the cloud.

According to exemplary aspects of FIG. 2, the computer 200 connects to the cloud storage 250 "N" times to perform N mount operations as described above, each to independent directories. Then there are will be N independent directories: mount point 1 (e.g., "/mnt1") to mount point N (e.g., "/mntN"). Each of these mount points are independently managed by a corresponding request handling process (e.g., Process 1 to Process N as shown in FIG. 2) and maintains its own queue of requests. In this aspect, there are N handling processes in the computer system 200 each with a queue of requests, thus creating multiqueued access to the storage 250. An image file (image 1 to image N) is created in each corresponding directory mount point 1 (e.g. "/mnt1") to mount point N (e.g. "/mntN"). Each of these images 1 to Nact as a file of a block device. In some aspects, each block device is a "ploop" block device. Subsequent to the creation of each image file, a block device is mounted to each of these image files 1 to N. Each block devices is associated with a corresponding image file. In other words, the block device provides access to the data from the corresponding image file. In this aspect, there are N block devices in the system: block device 1 (e.g., /dev/ploop1) to block device N (e.g., /dev/ploopN). Received requests pass through a chain starting with the block device1, then passed to image1, then to mount point 1 and are handled by Process 1. In exemplary aspects, a request received by the block device1 may be modified structurally, or a new request created, for delegation to other sub-components that conforms to the structure of requests in underlying components, e.g. those requests sent to the image1, and similarly for requests sent from image1 to mount point 1, and the like.

According to exemplary aspects, the file system is a user-space file system, in some aspects, a cloud file system. The image 1 to N may be in raw format, or in expanding format, e.g., qcow2 format.

Subsequently, in this aspect a union virtual device 206 is created. According to one aspect, the union virtual device 206 may be RAID 0, RAID 4 (with redundancy), ploop, or any other implementation for creating a stripe from several block devices. The UVD 206 may be a raid-stripe device or a raid-N, i.e., a stripe device with control bit(s). It is known that example of raid-stripe is raid 0 and examples of raid-N are raid 4, 5 or 6. As an example, RAID 0 is used, though any other virtual device able to split one fragment (e.g., a request) into several, each receiving content from different places and merging the received results, can also be used. In this example, a RAID0 device (an example of a virtual stripe device) can be created, and referred to as/dev/mapper/dm_M or "dm_raid0". According to exemplary aspects, the RAID 0 device is created according to standard Operating System methods.

The union virtual device operates as follows. If accessing a portion of this device is attempted, the union virtual device 206 selects an underlying block device to handle the request, and redirects the request to the selected block device. If the incoming request is larger than a predetermined threshold, then the union virtual device 206 splits the request into smaller requests of, in some aspects, a predetermined size. The union virtual device 206 than redirects or delegates the smaller requests to corresponding underlying block devices. In exemplary aspects, the delegating may also be of a client request for accessing the virtual block device stored on the cloud storage, Aspects of the present disclosure acknowledge various ways to select the corresponding underlying block devices (that were selected by) the union virtual device 206. For example, RAID0 provides a standard method for selecting the underlying block device. RAID 4, however, is more complex because RAID 4 also provides redundancy. If the union virtual device 206 is RAID0, the entire device (dm_raid0) is split into several parts. For example, a first part is managed by block device 1, a second part is managed by loop block device 2, and an Nth part is managed by loop block device N. In this aspect, the (N+1)th part is managed by loop block device 1, and so on. Typically, RAID0 is created from several hard disks. In the present example, RAID0 is created from loop block devices, e.g., ploop block devices.

According to an exemplary aspect, after the request to access data is handled by underlying block devices, the union virtual device merges the results and return the results to the requesting user.

Figure 3:
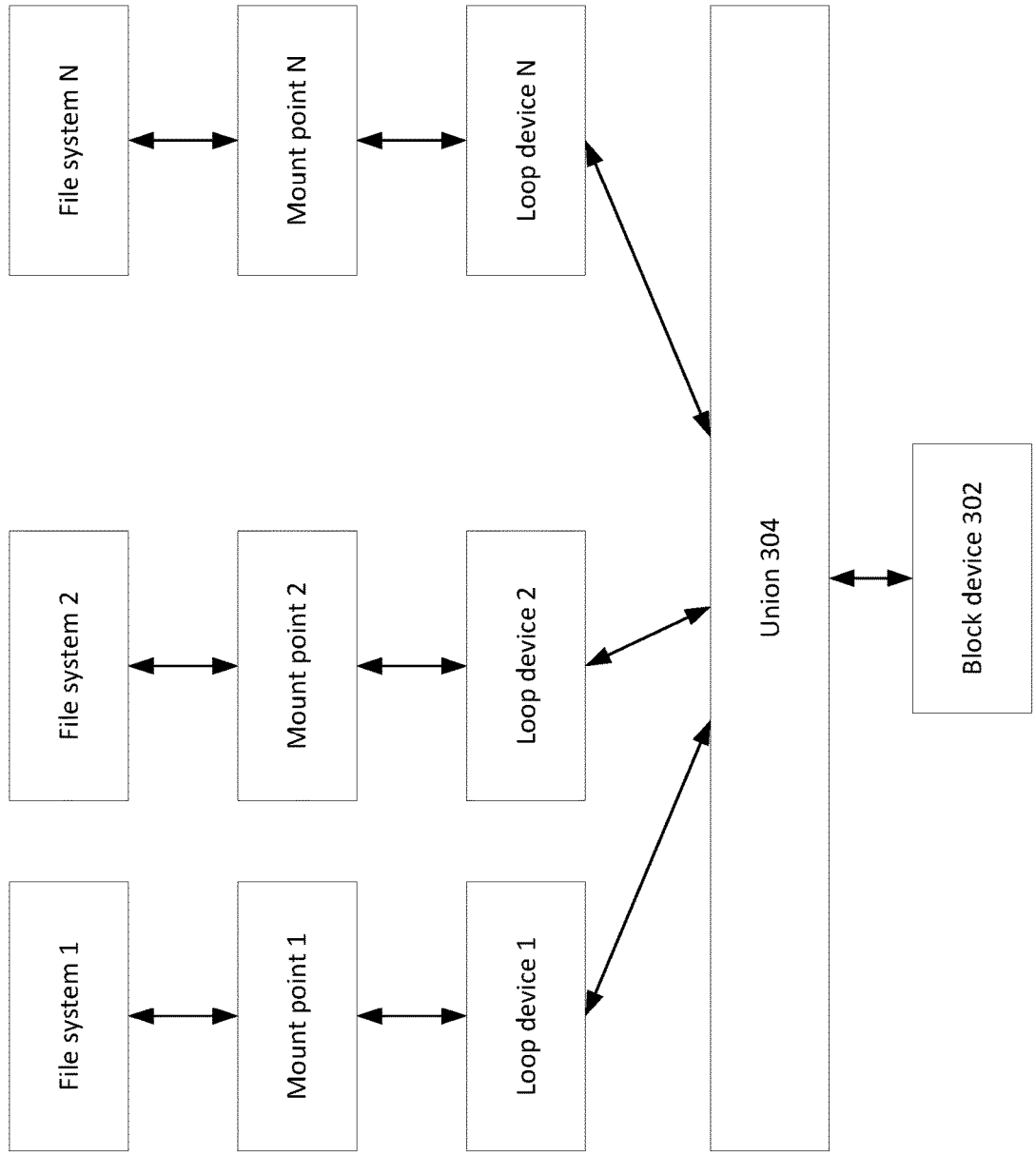
FIG. 3 is a block diagram for another system of multiqueued access to cloud storage, in accordance with exemplary aspects of the present disclosure.

In some aspects, a requesting user may be a file system of a VEE, for example, a container. In such an example, an application running in the VEE sends requests to the VEE file system, which sends requests to the union virtual device. A union virtual device 304 as shown in FIG. 3 then handles requests as described above. Furthermore, in some aspects there may be several file systems 1 to N simultaneously used by the union virtual device 304 (e.g., RAID 0, RAID 4 with redundancy, or any other implementation for creating a stripe from several block devices, or the like). These file systems 1 to N cannot handle requests in more than one queue or in more than one thread. The processes that handle requests to such file systems can store data in storage, or on block device 302 (e.g., instead of cloud storage), available to use (e.g., available to VEE). Thus the block device 302 can handle requests in parallel. Some of file systems 1 to N may be implemented as processes that handle requests to these file systems. Some of the file systems 1 to N may be user space processes. Data of the file systems may be stored on a block device (either physical or virtual) or on a cloud storage.

As a result, the requesting user receives data from cloud storage 250 through a chain as shown in the different embodiments depicted in FIG. 2 and FIG. 3. Using the methods described above helps to improve performance of user systems (e.g., computer system 200) by avoiding idle CPU cores, in some cases altogether. Further, using the methods described above, the time for processing huge requests significantly decreases because several parts of the request are handled in parallel. Furthermore, scalability is improved because the performance of the computer system is no longer limited by the productivity of only one CPU core. For different types of load, the number of request handling processes, mount points and block devices (N) can be varied. In some aspects, N can be changed on a working system so the system adjusts to the changed load, promoting parallelism on the system. Moreover, in the above described systems and methods, code for handling the process is rather simple because it can be single-threaded and synchronization in not needed on the client side. This scheme also allows for parallel execution of requests to cloud storage.

Figure 4:
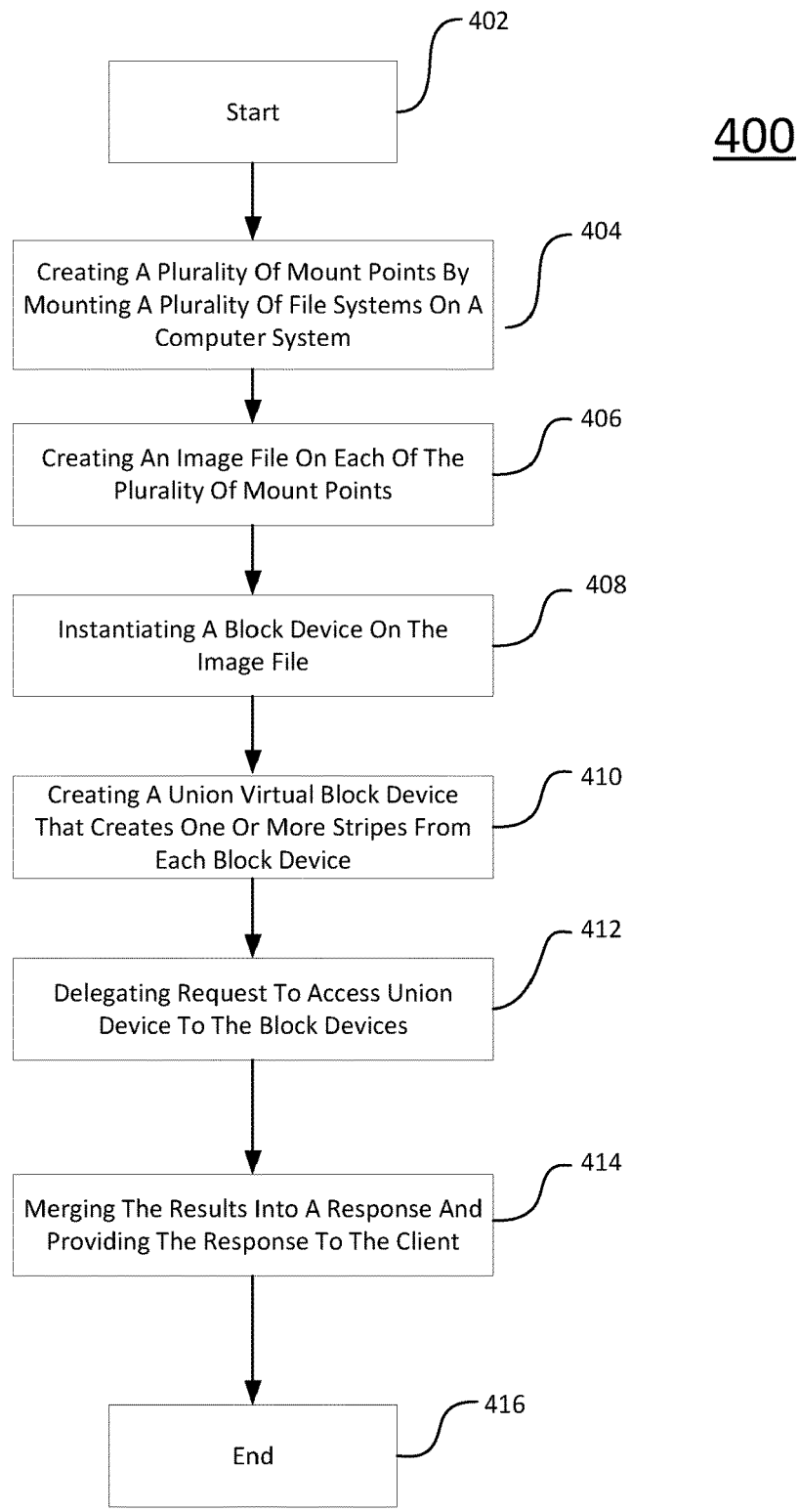
FIG. 4 is a flow diagram for a method of multiqueued access to cloud storage, in accordance with exemplary aspects of the present disclosure.

FIG. 4 is a flowchart illustrating a method 400 for multi-threaded access to cloud storage, according to an exemplary aspect of the present disclosure.

The method begins at 400 and proceeds to 402.

At 404, a plurality of mount points are created by mounting a plurality of file systems on a computer systems.

At 406, an image file is created on each of the plurality of mount points.

At 408, for each of the plurality of mount points, a block device is instantiated on the image file.

At 410, a union virtual block device is created that creates one or more stripes from each block device.

At 412, a request for accessing the union virtual block device, received from a client, is delegated to one or more block devices. Client requests for accessing the virtual block device stored on the cloud storage may also be delegated.

At 414, results of the request from each of the one or more block devices is merged and providing the result to the client. In exemplary aspect, each component of the system accepts requests in predetermined formats, and requests are modified or created according to the format/structure accepted by the component accordingly.

The method terminates at step 416.

In general, the term "module" as used herein can refer to a software service or application executed as part of the system 200. However, in general, the term module can be considered to be executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Figure 5:
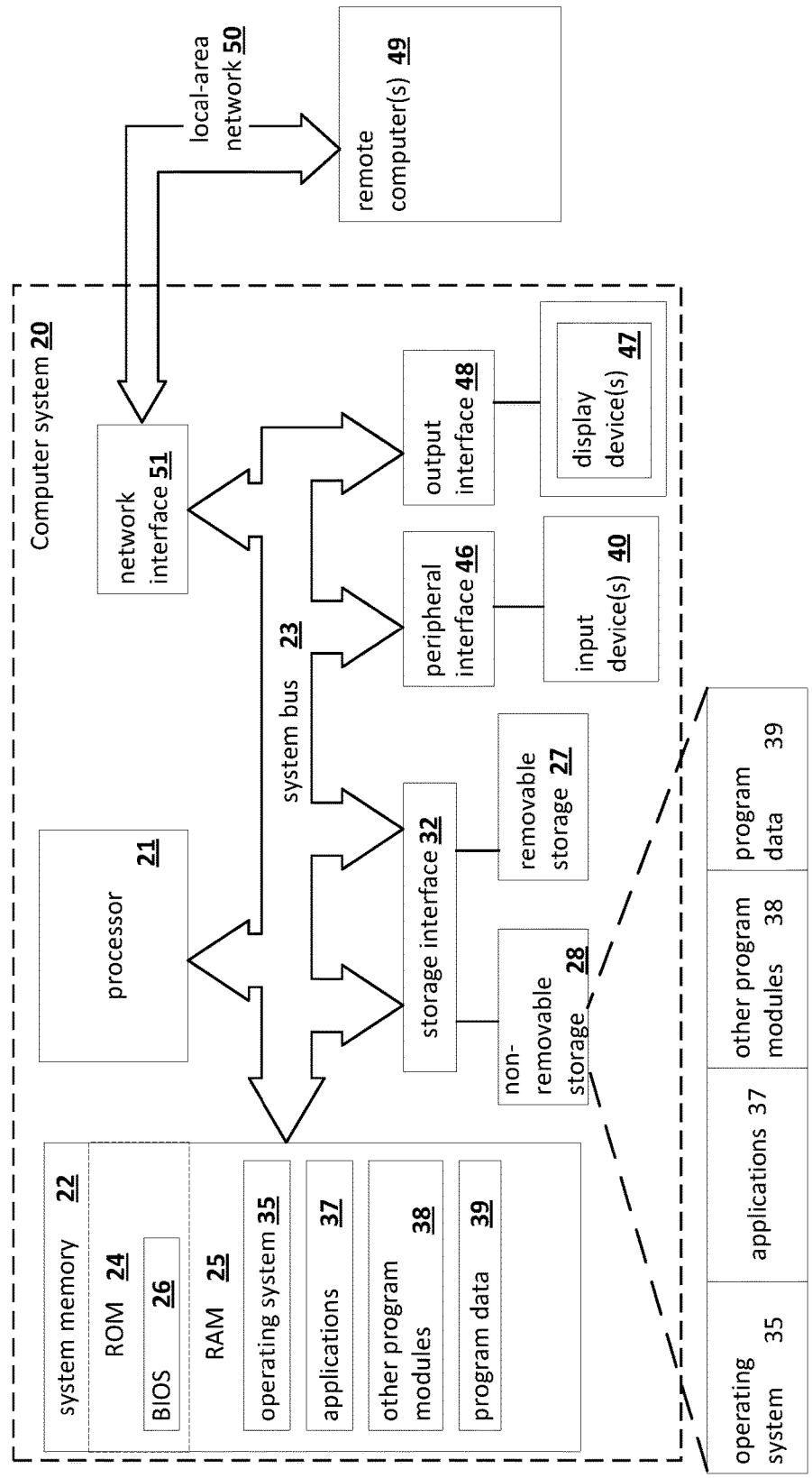
FIG. 5 is a block diagram illustrating a computer system on which aspects of systems and methods for multiqueued access to cloud storage may be implemented in accordance with an exemplary aspect.

FIG. 5 is a block diagram illustrating a computer system 20 on which aspects of systems and methods for multi-threaded access to cloud storage may be implemented in accordance with an exemplary aspect. It should be noted that the computer system 20 can correspond to computer 200 for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for multiqueued access to cloud storage comprising:
   creating a plurality of mount points by mounting, by a hardware processor, a plurality of file systems on a computer system;
   creating an image file on each of the plurality of mount points;
   instantiating, for each of the plurality of mount points, a block device on the image file;
   creating a union virtual block device that creates one or more stripes from each block device;

receiving, from a client, a request for accessing the union virtual block device;

splitting the request, when the request is larger than a predetermined threshold, into multiple requests;

delegating the multiple requests to a plurality of block devices;

merging a result of the multiple requests from each of the plurality of block devices and providing the result to the client.

2. The method of claim 1, wherein the client is a file system of a virtual execution environment, and the virtual execution environment is a container or a virtual machine.

3. The method of claim 1, wherein the client is a virtual machine, and a virtual machine disk image for the virtual machine is stored on the cloud storage.

4. The method of claim 1, wherein the plurality of file systems are user space file systems.

5. The method of claim 4, wherein each user space file system is a cloud file system.

6. The method of claim 1, wherein the image file is in one of a raw format, or an expanding format, wherein the expanding format is qcow2.

7. The method of claim 1, wherein the union virtual block device is one of a raid-stripe, or raid-N.

8. The method of claim 1, wherein the computer system is one or more of a chunk server or a metadata server.

9. A system for multiqueued access to cloud storage comprising:

a hardware processor configured to:

create a plurality of mount points by mounting a plurality of file systems on a computer system;

create an image file on each of the plurality of mount points;

instantiate, for each of the plurality of mount points, a block device on the image file;

create a union virtual block device that creates one or more stripes from each block device;

receive, from a client, a request for accessing the union virtual block device;

split the request, when the request is larger than a predetermined threshold, into multiple requests;

delegate the multiple requests to a plurality of block devices;

merge a result of the multiple requests from each of the plurality of block devices and providing the result to the client.

10. The system of claim 9, wherein the client is a file system of a virtual execution environment, and the virtual execution environment is a container or a virtual machine.

11. The system of claim 9, wherein the client is a virtual machine, and a virtual machine disk image for the virtual machine is stored on the cloud storage.

12. The system of claim 9, wherein the plurality of file systems are user space file systems.

13. The system of claim 12, wherein each user space file system is a cloud file system.

14. The system of claim 9, wherein the image file is in one of a raw format, or an expanding format, wherein the expanding format is qcow2.

15. The system of claim 9, wherein the union virtual block device is one of a raid-stripe, or raid-N.

16. The system of claim 9, wherein the computer system is one or more of a chunk server or a metadata server.

17. A non-transitory computer-readable medium, storing instructions thereon for multiqueued access to cloud storage, the instructions comprising:

creating a plurality of mount points by mounting a plurality of file systems on a computer system;

creating an image file on each of the plurality of mount points;

instantiating, for each of the plurality of mount points, a block device on the image file;

creating a union virtual block device that creates one or more stripes from each block device;

receiving, from a client, a request for accessing the union virtual block device;

splitting the request, when the request is larger than a predetermined threshold, into multiple requests;

delegating the multiple requests to a plurality of block devices;

merging a result of the multiple requests from each of the plurality of block devices and providing the result to the client.

\* \* \* \* \*